United States Patent
Kashima

(10) Patent No.: US 10,656,773 B2
(45) Date of Patent: May 19, 2020

(54) ALTERNATIVE PRESENTATION OF OCCLUDED HIGH-PRESENCE MATERIAL WITHIN AN ECOMMERCE ENVIRONMENT

(71) Applicant: Rakuten, Inc., Tokyo (JP)

(72) Inventor: Rei Kashima, Tokyo (JP)

(73) Assignee: Rakuten, Inc., Tokyo (JP)

(*) Notice: Subject to any disclaimer, the term of this patent is extended or adjusted under 35 U.S.C. 154(b) by 561 days.

(21) Appl. No.: 15/102,931

(22) PCT Filed: Apr. 15, 2014

(86) PCT No.: PCT/JP2014/060693
§ 371 (c)(1),
(2) Date: Jun. 9, 2016

(87) PCT Pub. No.: WO2015/159360
PCT Pub. Date: Oct. 22, 2015

(65) Prior Publication Data
US 2017/0123596 A1    May 4, 2017

(51) Int. Cl.
*G06F 3/0481* (2013.01)
*G06F 3/048* (2013.01)
*G06F 3/0485* (2013.01)
*G06Q 30/06* (2012.01)

(52) U.S. Cl.
CPC ............ *G06F 3/0481* (2013.01); *G06F 3/048* (2013.01); *G06F 3/0485* (2013.01); *G06Q 30/0633* (2013.01)

(58) Field of Classification Search
CPC .. G06F 3/0481; G06F 3/0485; G06Q 30/0633
See application file for complete search history.

(56) References Cited

U.S. PATENT DOCUMENTS 5,377,314 A * 12/1994 Bates .................... G06T 15/405
345/634
5,859,639 A *  1/1999 Ebrahim ............... G06F 3/0481
715/788

(Continued)

FOREIGN PATENT DOCUMENTS

JP    2010-079412 A    4/2010
JP    2014-093053 A    5/2014

OTHER PUBLICATIONS

International Search Report of PCT/JP2014/060693 dated Jul. 1, 2014 [PCT/ISA/210].

*Primary Examiner* — Eric J. Bycer
(74) *Attorney, Agent, or Firm* — Sughrue Mion, PLLC

(57) ABSTRACT

In an electronic shopping mall system (1), a receiving unit (1302) receives a content containing a higher-precedence material sent by a sending unit (1301). A display controller (1303) displays the content received by the receiving unit (1302) on a screen. The display controller (1303) displays, in response to an occurrence of an event, a pop-up on the screen in a manner superimposed on the content. In addition, when the higher-precedence material displayed on the screen is hidden by the pop-up, the display controller (1303) disposes an alternative material within the pop-up, and displays the alternative material on the screen. An executing unit (1305) executes a process associated with the higher-precedence material or the alternative material.

17 Claims, 14 Drawing Sheets

(56) References Cited

U.S. PATENT DOCUMENTS

| | | | | | |
|---|---|---|---|---|---|
| 6,002,397 | A | * | 12/1999 | Jaaskelainen, Jr. | G09G 5/14 715/797 |
| 6,031,530 | A | * | 2/2000 | Trueblood | G06F 3/0481 715/791 |
| 6,760,048 | B1 | * | 7/2004 | Bates | G06F 3/0481 715/781 |
| 2002/0154322 | A1 | * | 10/2002 | Tretter | H04N 1/4095 358/1.9 |
| 2003/0036963 | A1 | * | 2/2003 | Jacobson | G06Q 30/0611 705/313 |
| 2003/0210281 | A1 | * | 11/2003 | Ellis | G06F 3/0481 715/838 |
| 2003/0227489 | A1 | * | 12/2003 | Arend | G06F 3/0481 715/804 |
| 2006/0269132 | A1 | * | 11/2006 | Metcalfe | G06K 9/34 382/176 |
| 2006/0269142 | A1 | * | 11/2006 | Schweid | G06K 9/00456 382/209 |
| 2007/0245241 | A1 | * | 10/2007 | Bertram | G06F 9/453 715/711 |
| 2011/0225542 | A1 | * | 9/2011 | Schmieder | G06F 3/0481 715/794 |
| 2013/0174038 | A1 | * | 7/2013 | Sudhakar Palla | G06F 3/14 715/719 |

* cited by examiner

| COMMERCIAL PRODUCT CODE | COMMERCIAL PRODUCT NAME | IN-STOCK QUANTITY | SALES PRICE | COMMERCIAL PRODUCT IMAGE IN FIRST FORM | COMERCIAL PRODUCT IMAGE IN SECOND FORM | ... |
|---|---|---|---|---|---|---|
| 10001 | JOGGING SHOES COLER: WHITE SIZE: 24.5cm | 50 | ¥3500 | ... | ... | ... |
| 10002 | JOGGING SHOES COLER: WHITE SIZE: 25.0cm | 50 | ¥3500 | ... | ... | ... |
| 10003 | JOGGING SHOES COLER: WHITE SIZE: 25.5cm | 50 | ¥3500 | ... | ... | ... |
| ... | ... | ... | ... | ... | ... | ... |
| 10011 | GOLF SHOES COLER: BLUE SIZE: 24.5cm | 30 | ¥4500 | ... | ... | ... |
| ... | ... | ... | ... | ... | ... | ... |

ALTERNATIVE PRESENTATION OF OCCLUDED HIGH-PRESENCE MATERIAL WITHIN AN ECOMMERCE ENVIRONMENT

CROSS REFERENCE TO RELATED APPLICATIONS

This application is a National Stage of International Application No. PCT/JP2014/060693, filed Apr. 15, 2014, the contents of which are incorporated herein by reference in its entirety.

TECHNICAL FIELD

The present disclosure relates to a browsing device, a display controlling method, a non-transitory recording medium, and a program which are suitable for preventing a user from overlooking an important material.

BACKGROUND ART

Conventionally, there is a display method of popping up a second screen on a first screen when an instruction is given by a user while having a piece of information displayed on the first screen, and of displaying further detail information within the popped-up second screen. For example, while multiple so-called thumbnails that are scaled-down images are being displayed, when the user selects any one of the thumbnails, a detail image of an enlarged thumbnail that has been selected pops up and is displayed.

A pop-up display has advantages of easily getting attention from the user, and facilitating the understanding to the relevancy between the first screen and the second screen, and thus the pup-up display is frequently utilized in a wide range of fields. Conversely, there is also a disadvantage that the popped-up second screen hides a part of the first screen under the second screen.

Patent Literature 1 discloses a device that prevents first information from being hidden and becoming out of sight behind second information although the second information relating to the first information is displayed while having the first information displayed. Accordingly, when any one of buttons that is to be the first information is depressed, the device pops up and displays the second information relating to the depressed button. In addition, the device changes a display configuration of each button so as to enable the user to view all buttons, thereby preventing each button from being hidden and becoming out of sight by the pop-up.

CITATION LIST

Patent Literature

Patent Literature 1: Unexamined Japanese Patent Application Kokai Publication No. 2010-079412

SUMMARY OF INVENTION

Technical Problem

However, it is not always true that all information hidden by the pop-up is necessary for the user, and even if all buttons are caused to be always displayed, information that should be provided to the user with a higher precedence is buried in the whole information, and thus there is a problem that the user may rather overlook an important material. In addition, according to Patent Literature 1, it is necessary to design in advance both of a layout of respective buttons in a case in which no pop-up is displayed, and a layout of respective buttons that will not be hidden by the pop-up in a case in which the pop-up is displayed. Hence, the work at the designer's end is large.

The present disclosure has been made in view of the aforementioned circumstances, and an objective of the present disclosure is to provide a browsing device, a display controlling method, a non-transitory recording medium, and a program which are suitable for preventing a user from overlooking an important material.

Solution to Problem

According to a first aspect of the present disclosure, there is provided a browsing device including:

a display controller that displays, on a screen, a content containing at least one higher-precedence material, wherein:

the display controller displays, in response to an occurrence of an event, a pop-up on the screen in a manner superimposed on the content; and when the higher-precedence material displayed on the screen is hidden by the pop-up, the display controller disposes an alternative material within the pop-up, and displays the alternative material on the screen.

The browsing device may further include:

an accepting unit that accepts an operation to the content or to the pop-up displayed on the screen; and an executing unit that executes a process associated with the higher-precedence material or with the alternative material when the operation to the higher-precedence material or to the alternative material is accepted.

An appearance of the alternative material that is displayed on the screen may be associated in advance with an appearance of the higher-precedence material displayed on the screen, and the display controller may dispose the alternative material at a predetermined location within the pop-up.

The content may contain a first image that shows an object in a first form, and the pop-up may contain a second image that shows the object in a second form, and the display controller may display the pop-up when the operation to the first image is accepted.

The process associated with the higher-precedence material may be a process of starting a placement of an order to purchase the object.

The accepting unit may accept, from a user, an instruction that specifies a location within the screen; and the display controller may dispose the alternative material within the pop-up when determining that the higher-precedence material is hidden by the pop-up, and the accepted location within the screen is also within an area where the pop-up is displayed.

There may be a plurality of the higher-precedence materials; and the display controller may dispose, within the pop-up, a plurality of the alternative materials that respectively corresponds to the plurality of higher-precedence materials when all of the plurality of higher-precedence materials is hidden by the pop-up.

There may be a plurality of the higher-precedence materials; and the display controller may dispose, within the pop-up, a plurality of the alternative materials that respectively corresponds to the plurality of higher-precedence materials when at least one of the plurality of higher-precedence materials is hidden by the pop-up.

The display controller may determine, based on a pixel value associated with each pixel constructing the pop-up, an area formed by equal to or greater than a predetermined number of adjacent pixels that are each associated with a pixel value representing background color of the pop-up, and the display controller may dispose the alternative material within the determined area.

The display controller may expand the pop-up, and dispose the alternative material within the expanded area when there is no area formed by equal to or greater than the predetermined number of adjacent pixels that are each associated with a pixel value representing the background color of the pop-up.

The display controller may add the alternative material within the pop-up when the higher-precedence material is hidden due to a scrolling of the displayed content after the display controller displays the pop-up containing no alternative material.

The display controller may delete the alternative material from the pop-up when the higher-precedence material is no longer hidden due to a scrolling of the displayed content after the display controller displays the pop-up containing the alternative material.

According to another aspect of the present disclosure, there is provided a browsing device including:

a display controller that displays, on a screen, a first content containing a higher-precedence material, wherein:

the display controller displays, on the screen, a second content that is different from the first content in a manner superimposed on the first content, and when the higher-precedence material displayed on the screen is hidden by the second content, the display controller disposes an alternative material within the second content, and displays the alternative material on the screen.

According to yet another aspect of the present disclosure, there is provided a display controlling method including:

controlling display of a content containing a higher-precedence material on a screen, wherein:

the controlling the display includes, displaying, in response to an occurrence of an event, a pop-up on the screen in a manner superimposed on the content; and when the higher-precedence material displayed on the screen is hidden by the pop-up, disposing an alternative material within the pop-up, and displaying the alternative material on the screen.

According to yet another aspect of the present disclosure, there is provided a non-transitory computer readable recording medium having stored therein a program for causing a computer to function as:

a display controller that displays, on a screen, a content containing a higher-precedence material, wherein:

the display controller displays, in response to an occurrence of an event, a pop-up on the screen in a manner superimposed on the content; and when the higher-precedence material displayed on the screen is hidden by the pop-up, the display controller disposes an alternative material within the pop-up, and displays the alternative material on the screen.

According to yet another aspect of the present disclosure, there is provided a program that causes a computer to function as:

a display controller that displays, on a screen, a content containing a higher-precedence material, wherein:

the display controller displays, in response to an occurrence of an event, a pop-up on the screen in a manner superimposed on the content; and when the higher-precedence material displayed on the screen is hidden by the pop-up, the display controller disposes an alternative material within the pop-up, and displays the alternative material on the screen.

The aforementioned program can be distributed and sold over a computer communication network separately from a computer that executes the program. In addition, the aforementioned recording medium may be a non-transitory recording medium, and can be distributed and sold separately from the computer.

Advantageous Effects of Invention

According to the present disclosure, it becomes possible to prevent a user from overlooking an important material.

BRIEF DESCRIPTION OF DRAWINGS

FIG. 3 is a diagram illustrating example commercial product information stored in a commercial product database;

DESCRIPTION OF EMBODIMENTS

Embodiments of the present disclosure will be described below. It should be noted that the following embodiments are meant only to be illustrative and are not intended to limit the scope of the present disclosure. Accordingly, it will be apparent to those skilled in the art that various equivalent and alternative embodiments, in whole or in part, are possible, and the present disclosure also covers all of these embodiments.

Figure 1:
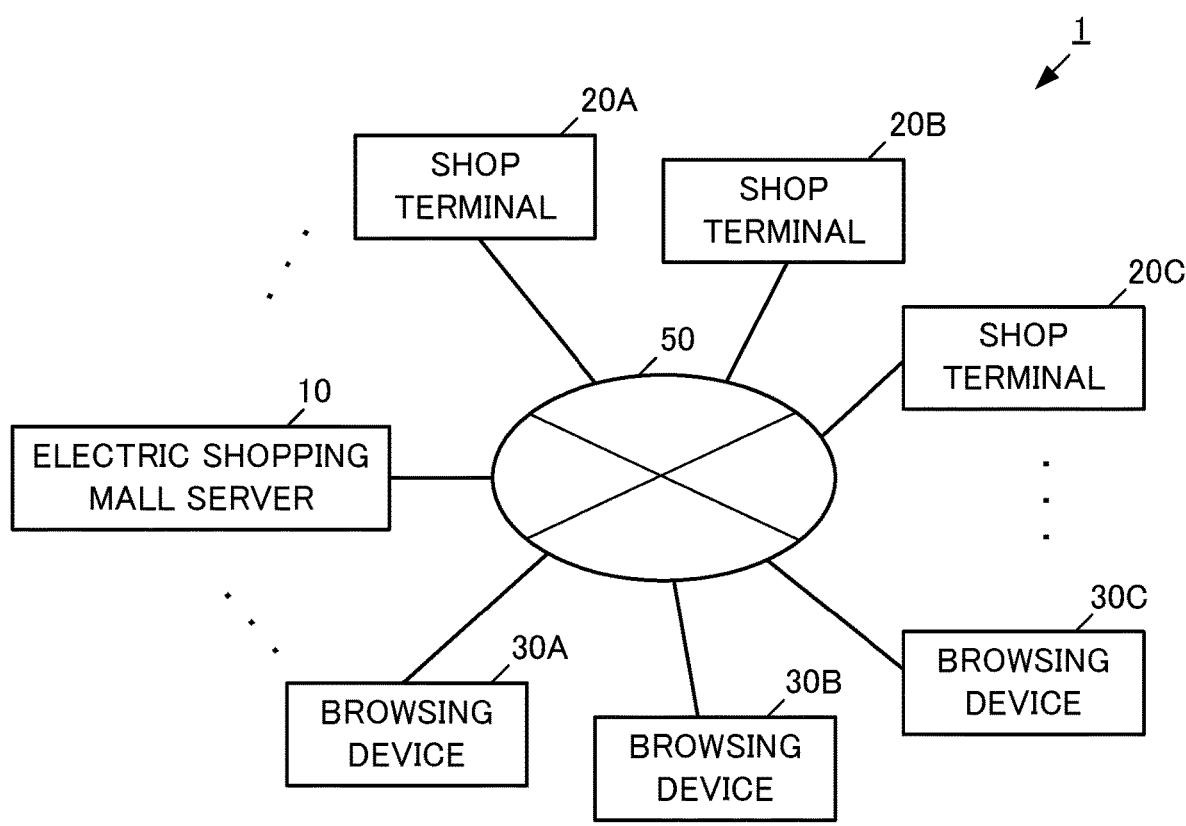
FIG. 1 is a diagram illustrating a general structure of an electronic shopping mall system.

First, a general structure of an electronic shopping mall system 1 according to an embodiment will be described with reference to FIG. 1. The electronic shopping mall system 1 includes an electronic shopping mall server 10, a shop terminal 20 (in FIG. 1, three shop terminals 20A, 20B, and 20C) installed at one or more shops that open up in the electronic shopping mall, a browsing device 30 (in FIG. 1, three browsing devices 30A, 30B, and 30C) used by a user who makes a purchase in the electronic shopping mall, and a communication network 50. In this embodiment, the communication network 50 is the Internet.

The electronic shopping mall server 10 manages a virtual electronic shopping mall over the Internet in which multiple shops participate. The electronic shopping mall server 10 is managed by an administrator of the electronic shopping mall. The number of participating shops in the electronic shopping mall is optional. Various commercial products and services are to be sold in the electronic shopping mall.

For the purposes of simplification, a commercial product and a service are hereinafter collectively referred to as a "commercial product", and the commercial product includes intangible services, for example, a hotel reservation, an online ticketing, and a license to use a software.

The shop terminal 20 is placed in a shop that sells the commercial products in the electronic shopping mall. A sales manager of the shop operates the shop terminal 20, and registers, in the electronic shopping mall server 10, commercial product information indicating a commercial product to be sold by a local company of the shop.

The commercial product information contains multiple materials, more specifically, for example, a commercial product image in a first form and that in a second form which represent a commercial product, a commercial product code that identifies the commercial product, a commercial product name, a commercial product description, an in-stock quantity of the commercial product, a unit sales price of the commercial product, a commercial product size, a commercial product weight, a shipping cost of the commercial product, an image of the commercial product, and a time and date for providing a service.

The commercial product image in the first form is generally referred to as a thumbnail which is an image with a smaller display size than that of the second form. The commercial product image in the second form is the image having a larger display size than that of the image in the first form.

The commercial product image in the first form and that in the second form both represent an image of the same commercial product. For example, a picture of a commercial product having a height of X pixels and a width of Y pixels and picked up from a certain angle is scaled-down to 25% of the size in both height and width, and the commercial product image in the first form is obtained. The original picture having the height of X pixels and the width of Y pixels is the commercial product image of the second form.

The commercial product information contains a pop-up material that pops up, and is displayed based on an instruction from the user. For example, the pop-up material is the commercial product image. When the user moves a mouse cursor over a thumbnail that is displayed in the first form, a screen (window) containing the commercial product image in the second form having an enlarged display size and corresponding to this thumbnail is popped up and displayed.

That is, first, the commercial product image in the first form is displayed, and if a condition is satisfied after the user operation is carried out, the commercial product image in the second form is displayed.

In addition, the commercial product information also contains a higher-precedence material that should be displayed with a higher precedence over other materials. When the higher-precedence material is hidden under the popped-up window, an alternative material containing the same content as this higher-precedence material is displayed at an altered display location. In this embodiment, the alternative material is displayed within the popped-up window. Details will be discussed later.

The electronic shopping mall server 10 stores commercial product information indicating a commercial product to be sold in the electronic shopping mall, and sends the commercial product information to the browsing device 30 that has made an access request.

The commercial product information is provided to the browsing device 30 through a webpage that is accessible from the browsing device 30. The webpage includes HyperText Markup Language (HTML) data, image data, sound data, and the like. The webpage may not be in the HTML format, and may be in, for example, an Extensible Markup Language (XML) format, or an Extensible HyperText Markup Language (XHTML) format. In addition, the commercial product information may be provided to the browsing device 30 through a special-purpose application which is pre-installed in the browsing device 30, and which is provided by the electronic shopping mall.

The browsing device 30 is operated by the user who browses commercial product information relevant to a commercial product listed in the electronic shopping mall. The user operates the browsing device 30 to access the electronic shopping mall server 10, browses the commercial product information, and places an order to purchase the commercial product.

The communication network 50 connects among the electronic shopping mall server 10, the shop terminal 20, and the browsing device 30. Although a typical communication network 50 is the Internet, the communication network may include a telephone line, an exclusive line, a Local Area Network (LAN), and the like.

Figure 2:
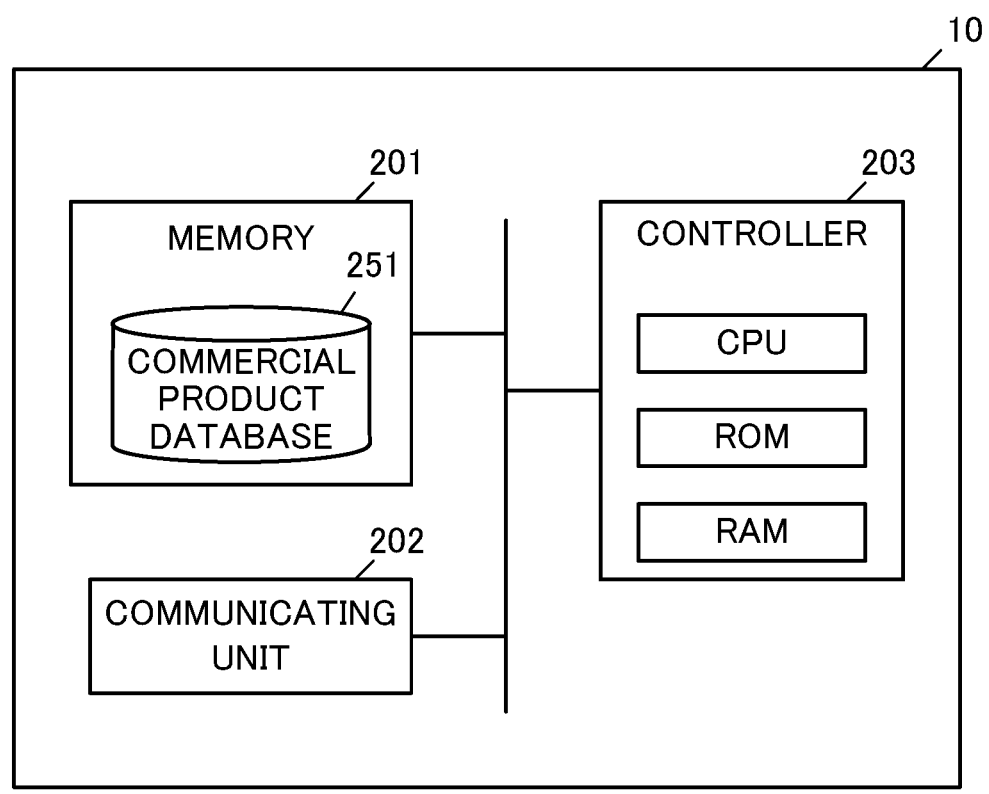
FIG. 2 is a diagram illustrating a structure of an electronic shopping mall server.

Next, a hardware structure of the electronic shopping mall server 10 will be described with reference to FIG. 2. The electronic shopping mall server 10 includes a memory 201, a communicating unit 202, and a controller 203.

The memory 201 includes a memory device like a hard disk. The memory 201 stores a commercial product database 251. The commercial product database 251 stores the commercial product information on all commercial products listed in the electronic shopping mall.

FIG. 3 illustrates an example structure of the commercial product information stored in the commercial product database 251. The commercial product database 251 stores, in association with a commercial product code that identifies the commercial product, various data that indicate attributes of a commercial product, such as a commercial product name, an in-stock quantity, a sales price, and a commercial product image in the first form and that in the second form. The commercial product information is updated at any time through the shop terminal 20 operated by the manager of the shop selling the product, or through the electronic shopping mall server 10.

The communicating unit 202 includes a Network Interface Card (NIC), connects the electronic shopping mall server 10 with the communication network 50, and communicates with the shop terminal 20 and the browsing device 30.

The controller 203 includes a Central Processing Unit (CPU), a Read Only Memory (ROM), a Random Access Memory (RAM), and the like, and controls the whole electronic shopping mall server 10.

The electronic shopping mall server 10 applicable is a typical computer server, a main frame, a cloud server, or the like.

Figure 4:
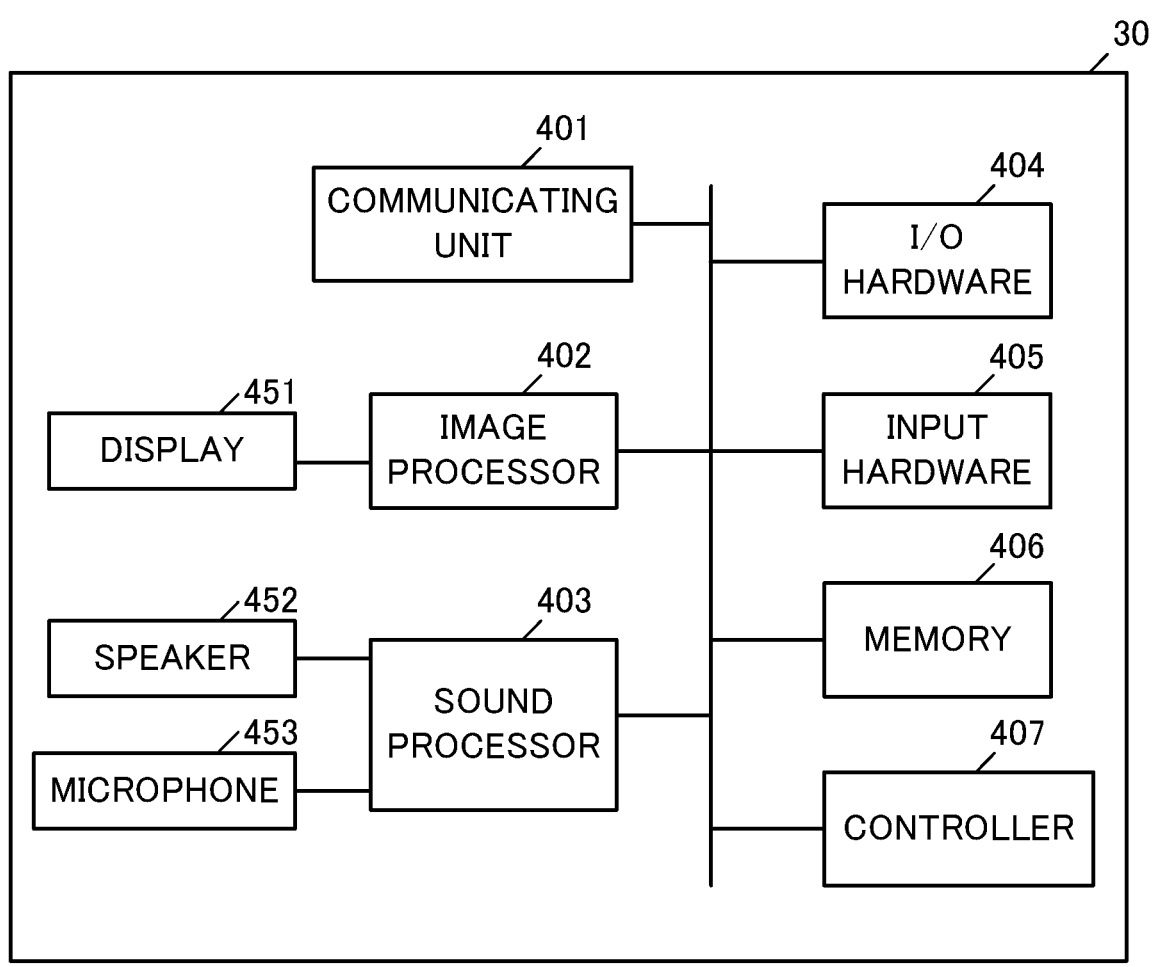
FIG. 4 is a diagram illustrating a structure of a browsing device.

Next, a hardware structure of the browsing device 30 will be described with reference to FIG. 4. The browsing device 30 includes a communicating unit 401, an image processor 402, a sound processor 403, an Input/Output (I/O) hardware 404, an input hardware 405, a memory 406, and a controller 407.

The communicating unit 401 includes an NIC, connects the browsing device 30 with the communication network 50, and communicates with the electronic shopping mall server 10.

The image processor 402 generates an image, and displays the generated image on a display 451. For example, the image processor 402 receives, from the electronic shopping mall server 10 through the communicating unit 401, HTML data and image data constructing a webpage that contains the aforementioned commercial product information, and HTML data and image data constructing a webpage that accepts purchase of the product, and displays, on the display 451, a screen that introduces the product, a screen that accepts the purchase of the commercial product, and the like.

The sound processor 403 obtains sound data from the memory 406 or the electronic shopping mall server 10, plays and outputs sound from a speaker 452.

The I/O hardware 404 includes an interface that connects a removable memory card with the browsing device 30.

The input hardware 405 includes an interface that accepts an entry from the user. In this embodiment, the input hardware 405 includes a keyboard and a mouse.

The memory 406 includes memory devices like a ROM and a RAM, and stores an operating system that controls the browsing device 30, various programs, image data, sound data, text data, and the like.

The controller 407 includes a CPU, and controls the whole browsing device 30.

The typical browsing device 30 applicable is a typical personal computer, a mobile phone, a smart phone, a mobile terminal, a tablet computer, or the like equipped with a communication function. In this embodiment, a personal computer is employed as the browsing device 30.

Note that since a hardware structure of the shop terminal 20 is equivalent to that of the browsing device 30, detailed discussion thereof will be omitted.

Next, a display controlling process executed in the electronic shopping mall system 1 of this embodiment will be described.

Figure 5:
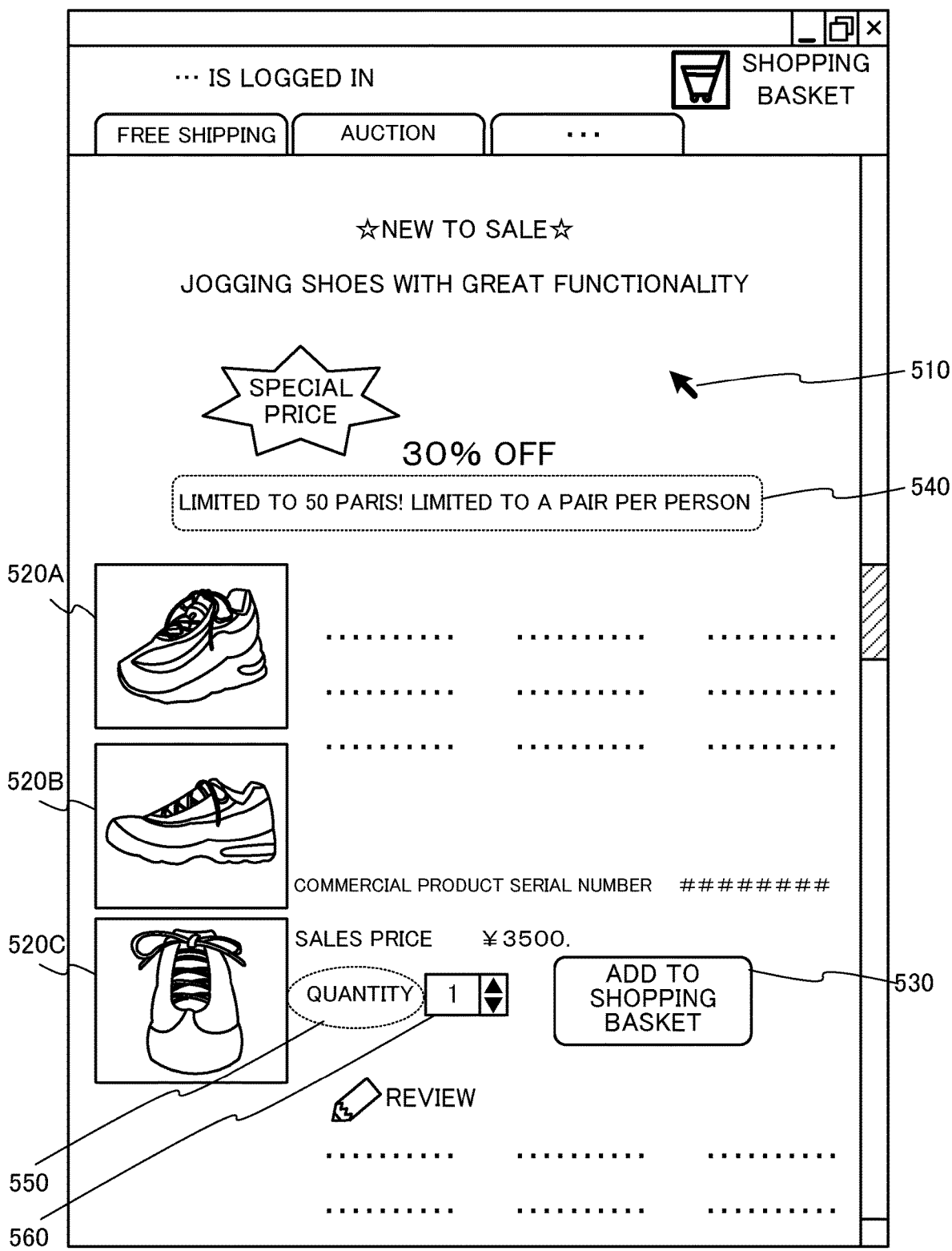
FIG. 5 is a diagram illustrating a display example of commercial product information.

FIG. 5 illustrates example commercial product information displayed on the display 451 of the browsing device 30. In this embodiment, the controller 407 executes an application software (hereinafter, referred to as a "browser") used to enable the user to browse the commercial product information. The controller 407 obtains the commercial product information from the electronic shopping mall server 10, and displays the commercial product information on the browser. Note that the controller 407 may execute a pre-installed application software specialized for the electronic shopping mall to display the commercial product information.

An instruction mark 510 indicates a location specified by a user and is typically called a mouse pointer or a mouse cursor. The user can operate the mouse and move the instruction mark 510 to any arbitrary location.

Figure 6:
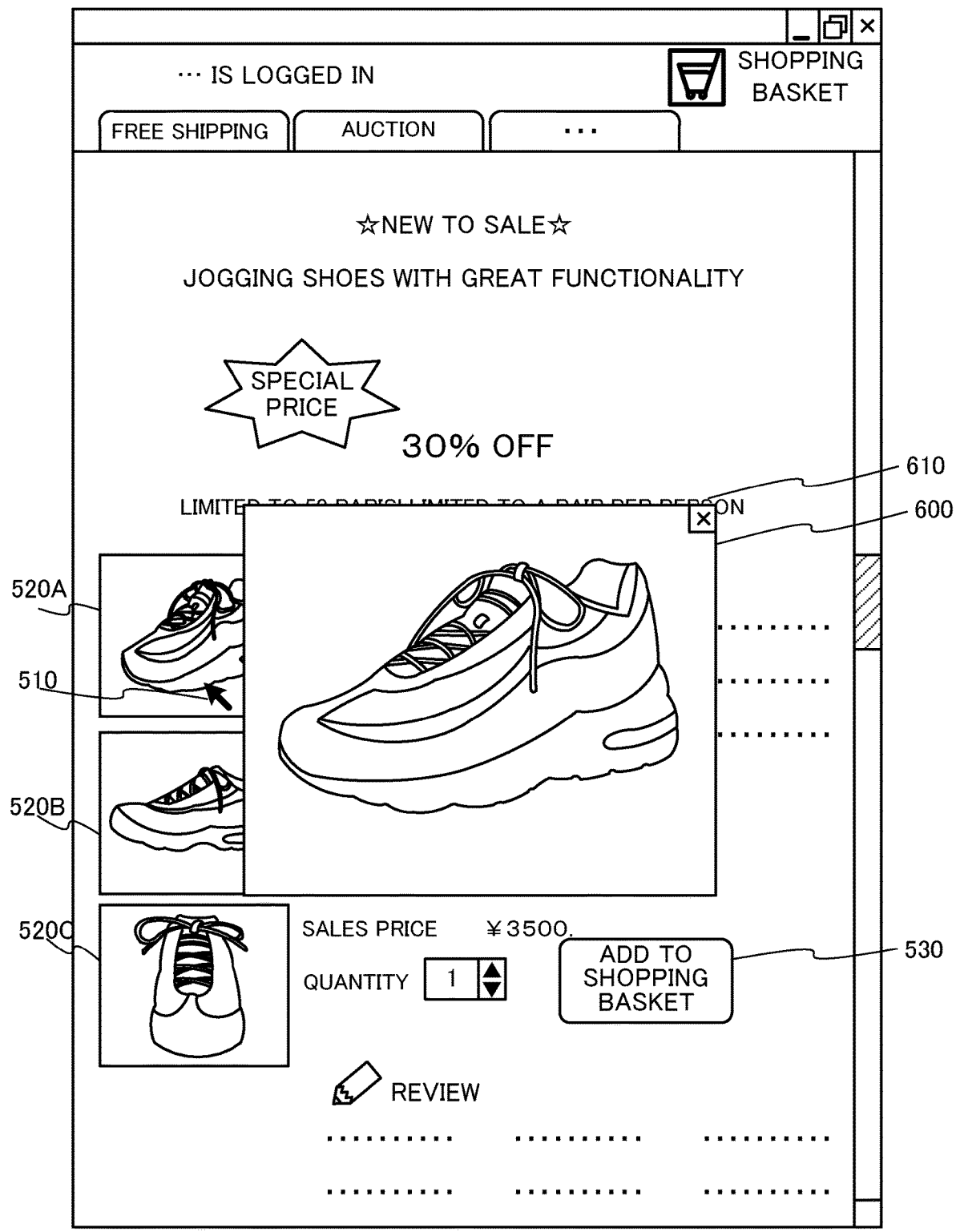
FIG. 6 is a diagram illustrating a display example of commercial product information and a popped-up image.

A thumbnail 520 (in FIG. 5, three thumbnails 520A, 520B, and 520C) is the commercial product image contained in the commercial product information and having a scaled-down display size. For example, when the instruction mark 510 is moved within an area where the thumbnail 520A is displayed, the controller 407 displays, as illustrated in FIG. 6, a popped-up image 600 containing an enlarged commercial product image corresponding to the thumbnail 520A. The same is true of the thumbnail 520B and 520C.

The popped-up image 600 is displayed as another window in a manner superimposed on the browser.

In this embodiment, although the popped-up image 600 is being displayed, the user is capable of operating the browser that displays the commercial product information other than the popped-up image 600. For example, although the popped-up image 600 is being displayed, the user can operate an order-placing object 530 to place an order to purchase the commercial product.

A location at which the popped-up image 600 is displayed is the center within the whole display are of the browser. Alternatively, the location at which the popped-up image 600 is displayed may be the center within the whole display area of the display 451.

The controller 407 can move the popped-up image 600 based on an instruction given by the user. When, for example, the instruction mark 510 is disposed on the popped-up image 600, and the instruction mark 510 is moved while maintaining a selection instruction to the pop-up image 600, that is, when the popped-up image 600 is dragged, the controller 407 moves the popped-up image 600 in accordance with the drag operation.

Note that the controller 407 may always have a fixed display location for the popped-up image 600.

When a delete object 610 contained in the popped-up image 600 is operated by the user, the controller 407 deletes the popped-up image 600. The delete object 610 is a software button that accepts, from the user, an instruction to delete the popped-up image 600.

The controller 407 may delete the popped-up image 600 when the instruction mark 510 is moved to the exterior of the area where the thumbnail 520 is displayed or the area where the popped-up image 600 is displayed.

Note that the controller 407 may set an extension time, keep displaying the popped-up image 600 until the extension time elapses from a time at which the instruction mark 510 is moved to the exterior of the area where the thumbnail 520 is displayed or the area where the pop-up image 600 is displayed, and delete the pop-up image 600 when the extension time has elapsed.

When the instruction mark 510 is moved within the area where the thumbnail 520 is displayed, and the user operation is accepted, the controller 407 may display the popped-up image 600 containing the commercial product image corresponding to the thumbnail 520.

A typical user operation is a click operation of a mouse. In this case, although the popped-up image 600 is not displayed when the user simply moves the instruction mark 510 over the thumbnail 520, the popped-up image 600 is displayed when the mouse is clicked with the instruction mark 510 being disposed on the thumbnail 520.

The order-placing object 530 accepts, from the user, an order to purchase the commercial product indicated by the commercial product information. The user can place an order to purchase the commercial product in the electronic shopping mall by operating the order-placing object 530. The order-placing object 530 is a software button that accepts, from the user, an order to purchase the commercial product that is displayed. This order-placing object 530 is included in the aforementioned higher-precedence material.

In the following description, with regard to the selection instruction given by the user while having the instruction mark 510 within the area where the order-placing object 530 is displayed, this is referred to as, "a button is depressed".

When an embodiment is employed in which the displayed popped-up image 600 is not deleted and maintained as it is until the extension time elapses after the instruction mark 510 is moved away from the popped-up image 600, or when an embodiment is employed in which the displayed popped-up image 600 is maintained until the delete object 610 is operated by the user, the controller 407 can accept a user operation to the order-placing object 530 and the like that is not contained in the popped-up image 600 although the popped-up image 600 is being displayed. For example, in FIG. 6, the user can operate the order-placing object 530, and display other popped-up images 600 containing enlarged commercial product images corresponding to the thumbnails 520A, 520B, and 520C while having the popped-up image 600 displayed.

Note that in this embodiment, the number of popped-up images 600 to be displayed at once is limited to one. When, for example, the instruction mark 510 is moved within the area where the thumbnail 520B is displayed while the popped-up image 600 containing the commercial product image corresponding to the thumbnail 520A is being displayed, the controller 407 displays a new popped-up image 600 containing the commercial product image corresponding to the thumbnail 520B after deleting the popped-up image 600 containing the commercial product image corresponding to the thumbnail 520A. Note that an embodiment in which the controller 407 can simultaneously display equal to or greater than two popped-up images 600.

Figure 7:
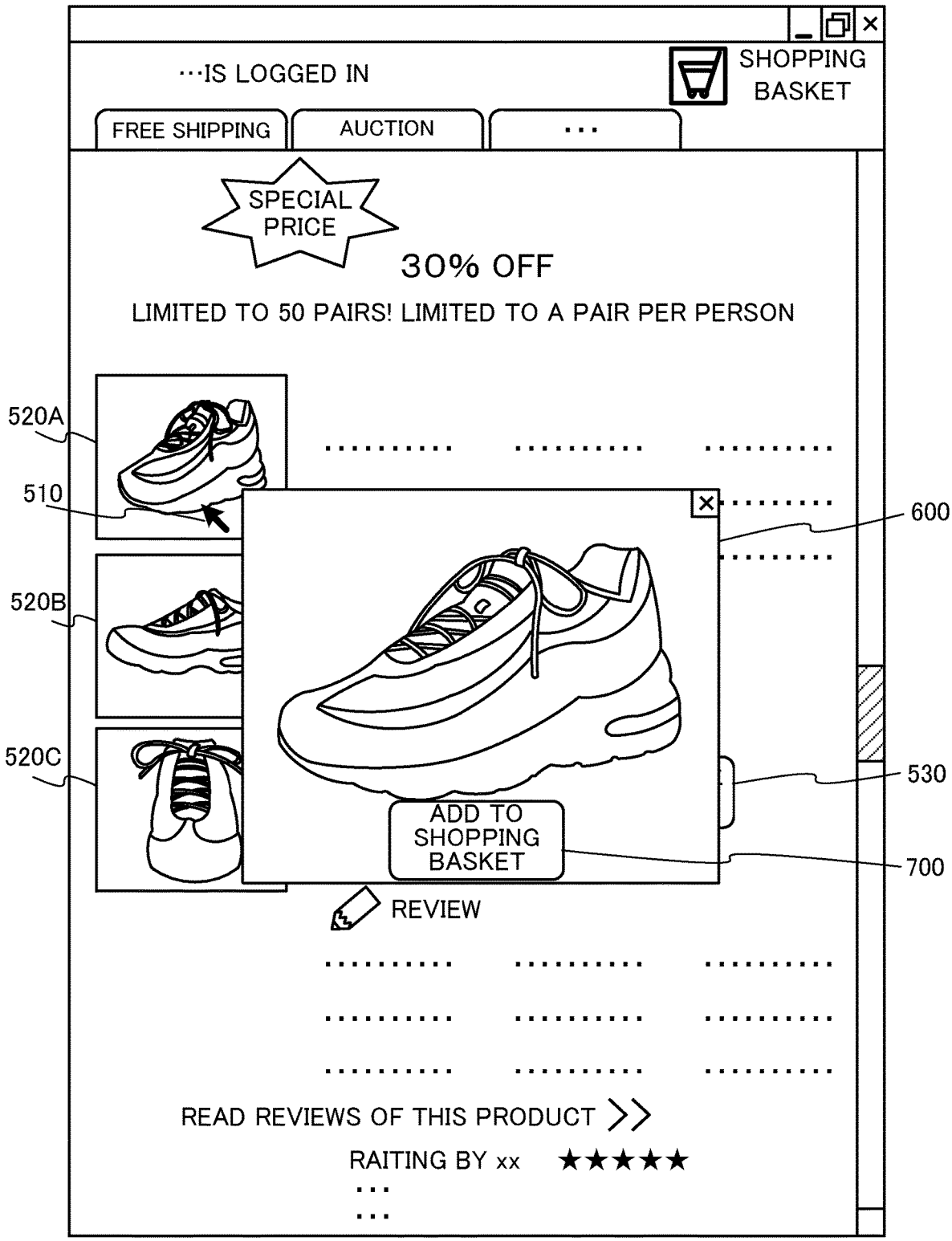
FIG. 7 is a diagram illustrating a display example of commercial product information and a popped-up image containing an alternative material.

In the meantime, when the popped-up image 600 is displayed, a part of the commercial product information that is overlapped with the popped-up image 600 is hidden by the popped-up image 600, thereby becoming out of sight of the user. For example, as illustrated in FIG. 7, the order-placing object 530 may be hidden by the popped-up image 600. In this case, the shop may miss opportunities to sell the commercial products, and the user needs to move away or delete the popped-up image 600 in order to purchase the commercial product, thus annoying. Hence, according to this embodiment, when the order-placing object 530 that is the higher-precedence material is hidden by the popped-up image 600, the controller 407 displays, within the popped-up image 600, an alternative object 700 as an alternative to the order-placing object 530.

More specifically, the controller 407 displays the alternative object 700 having the same appearance and the same associated process as those of the order-placing object 530 at a predetermined location within the popped-up image 600. The alternative object 700 is also referred to as an alternative material.

The term predetermined location is, for example, below the commercial product image, the upper left corner, the lower left corner, the upper right corner, the lower right corner, or the like in the popped-up image 600 as viewed from the user. It is desirable that the alternative object 700 should not overlap with the commercial product image.

The controller 407 may obtain a location that does not overlap with the commercial product image through a calculation performed at any time. More specifically, the controller 407 obtains a pixel value of each pixel that constructs image data corresponding to the commercial product image displayed within the popped-up image 600. The pixel value is expressed by a combination of an illuminance value of red (R), an illuminance value of green (G), and an illuminance value of blue (B). For example, in a case of the 24-bit color with each color (also referred to as a channel) expressed by 8 bits, the pixels with R=255, G=255, and B=255 indicate white color. The controller 407 determines a blank area where equal to or greater than a reference number of pixels representing white color are disposed adjacent to one another, and displays the alternative object 700 within the determined blank area. Hence, the controller 407 is capable of calculating the optimal display location at each occasion, and displaying the alternative object 700.

The aforementioned reference number is equal to or greater than the number of pixels constructing the alternative object 700. More specifically, the number of pixels that adjoin one another in the vertical direction is equal to or greater than the number of pixels constructing the alternative object 700 in the vertical direction, and the number of pixels that adjoin one another in the horizontal direction is equal to or greater than the number of pixels constructing the alternative object 700 in the horizontal direction.

When the background color of the popped-up image 600 is, for example, black or any color other than white, the controller 407 searches a blank area where equal to or greater than the reference number of pixels representing the background color are disposed adjacent to one another.

When there is no blank area where equal to or greater than the reference number of pixels representing the background color are disposed adjacent to one another, the controller 407 may expand the popped-up image 600 in any one of four directions that are the upward, downward, leftward, and rightward directions, and may display the alternative object 700 within this expanded area.

The higher-precedence material is not limited to the order-placing object 530. The controller 407 can set an arbitrary material contained in the commercial product information, an arbitrary character string composed of equal to or greater than one character or number, and the like, as the higher-precedence material.

Figure 8:
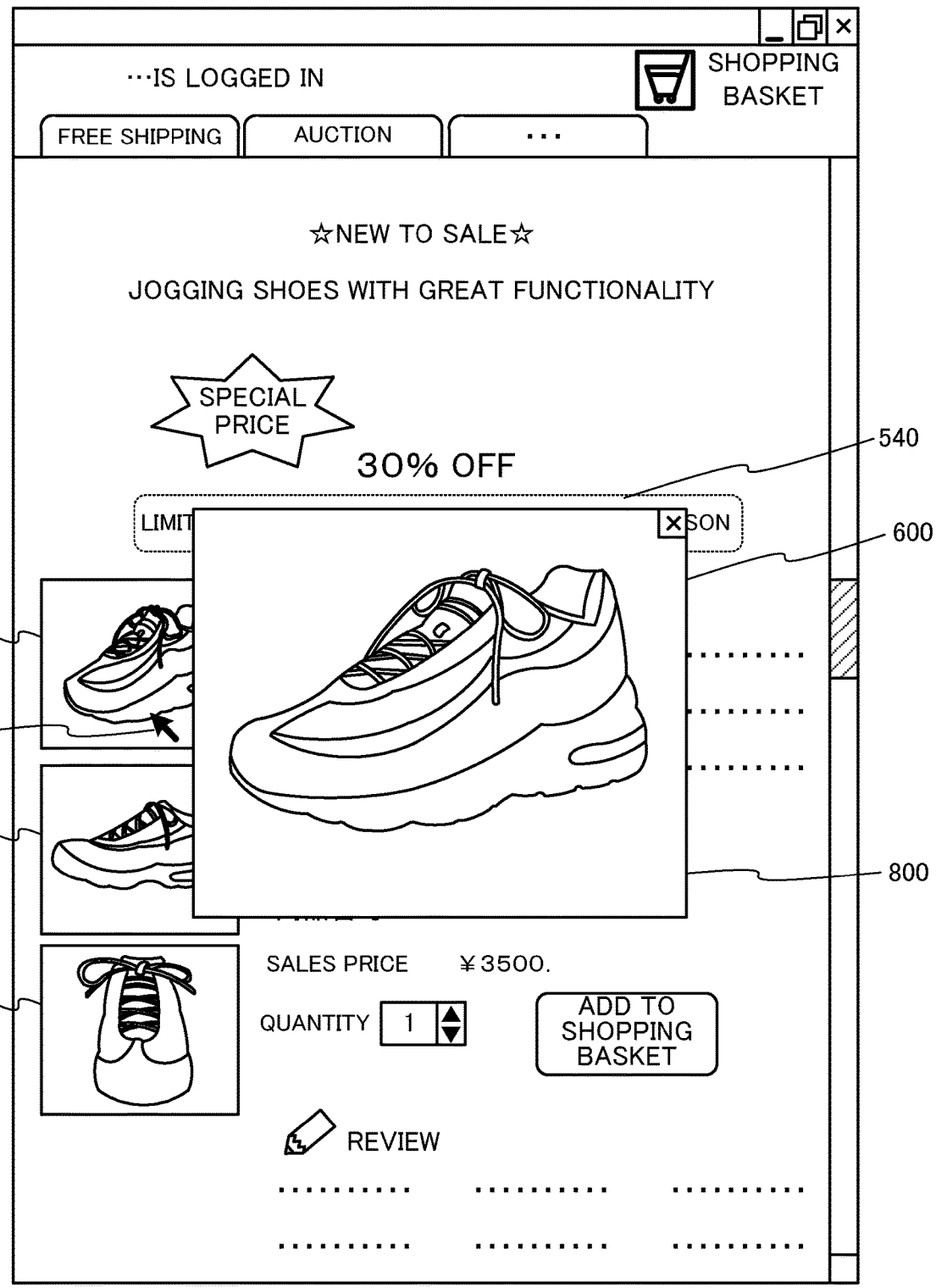
FIG. 8 is a diagram illustrating a display example of commercial product information and a popped-up image containing an alternative material.

FIG. 8 illustrates another example display of the commercial product information and the popped-up image 600. In a case in which a character string 540 to the effect that "Limited to 50 pairs! Limited to a pair per person" is set as the higher-precedence material, and when this character string 540 is hidden by the popped-up image 600, the controller 407 displays, within the popped-up image 600, an alternative object 800 that is an alternative to the character string 540.

The controller 407 displays, within the popped-up image 600, the alternative object 800 representing the same character string as the character string 540 that is the higher-precedence material.

The controller 407 may add a line break at an arbitrary location in the character string 540, and change a character font, a character size, character color, and the like in accordance with a size of the popped-up image 600.

That is, it is unnecessary that the higher-precedence material (the order-placing object 530 and the like) is exactly consistent with the alternative material (the alternative object 700 and the like). When the higher-precedence material is a software button, the size, shape, color, design, and the like of the software button may be different as long as at least the process associated with this software button is consistent.

The higher-precedence material is not limited to a software button and a character string, and may be, for example, a still image, a motion image, an icon that is associated with a process to be executed when the user operates this icon, a text box that accepts an entry of characters, a radio button that accepts a selection among options, a drop-down list, a list box, a combo box, and the like.

In this embodiment, the commercial product information is constructed by data in the HTML format, and the higher-precedence material is defined by a tag. For example, the higher-precedence material can be specified using a class attribute that is added to a tag <span>. In addition, the higher-precedence material can be also specified using an originally defined class attribute.

Instead of using the attribute of tag, a tag name can be used to specify the higher-precedence material. For example, a material that is described with a specific tag, such as a tag <b> that makes the text to be displayed in bold text, a tag <em> that displays the emphasized text, and a tag <button> that defines a software button, may be the higher-precedence material.

The number of the higher-precedence materials is not limited to one, and may be equal to or greater than two.

Figure 9:
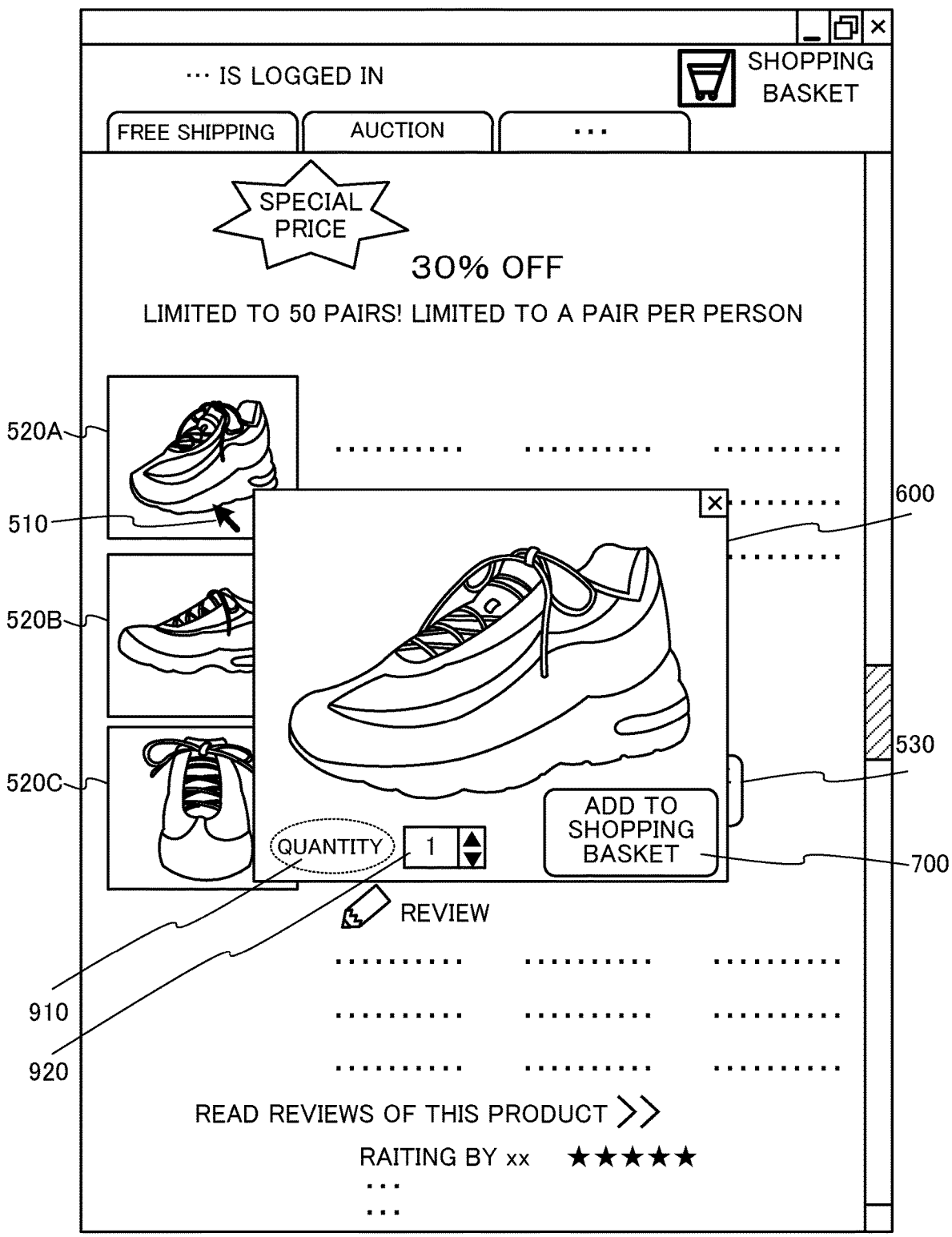
FIG. 9 is a diagram illustrating a display example of commercial product information and a popped-up image containing multiple alternative materials.

For example, in FIG. 5, when three higher-precedence materials that are the order-placing object 530, a character string 550 that is "quantity", and a list box 560 that accepts an entry of quantity are set as the higher-precedence materials, and when these higher-precedence materials are all hidden by the popped-up image 600, the controller 407 displays, within the popped-up image 600 as illustrated in FIG. 9, the alternative object 700 that is the alternative to the order-placing object 530, an alternative object 910 that is an alternative to the character string 550, and an alternative object 920 that is an alternative to the list box 560.

When at least one of the set higher-precedence materials is hidden by the popped-up image 600, the controller 407 may display, within the popped-up image 600, the alternative objects that are the respective alternatives to all higher-precedence materials including the hidden higher-precedence material.

For example, in FIG. 5, when three higher-precedence materials that are the order-placing object 530, the character string 550 that is "quantity", and the list box 560 that accepts an entry of quantities are set as the higher-precedence materials, and when only the order-placing object 530 among these three higher-precedence materials is hidden by the popped-up image 600, the controller 407 may display, within the popped-up image 600 as illustrated in FIG. 9, the alternative object 910 that is the alternative to the character string 550, and the alternative object 920 that is the alternative to the list box 560 in addition to the alterative object 700 that is the alternative to the order-placing object 530.

When the embodiment is employed in which the popped-up image 600 is not deleted but is maintained as it is until the extension time elapses after the instruction mark 510 is moved away from the popped-up image 600, or when the embodiment is employed in which the displayed popped-up image 600 is maintained until the delete object 610 is operated by the user, there is a possibility that a browser which is displaying the commercial product image is scrolled over while the popped-up image 600 is displayed. In addition, even if the higher-precedence material is not hidden at the time of starting the display of the popped-up image 600, there is a possibility that the higher-precedence material is hidden by the popped-up image 600 after the scrolling. Thus, when the higher-precedence material is hidden while the popped-up image 600 that does not contain the alternative object 700 is displayed, the controller 407 may newly add and display, at a predetermined location within the popped-up image 600, the alternative object 700 that is the alternative to the higher-precedence material. The predetermined location is, for example, the bottom of the popped-up image 600 as viewed from the user.

In addition, even if the higher-precedence material is hidden at the time of starting the display of the popped-up image 600 and the alternative object 700 is displayed, there is a possibility that the higher-precedence material will not be hidden by the popped-up image 600 after the scrolling. Thus, when the higher-precedence material is no longer hidden while the popped-up image 600 containing the alternative object 700 is displayed, the controller 407 may either delete the alternative object 700 or keep displaying the alternative object once displayed.

When the instruction mark 510 is located on the popped-up image 600, there is a possibility that the user is highly interested in the commercial product shown by the popped-up image 600. Conversely, when the instruction mark 510 is not located on the popped-up image 600, the possibility that the user is interested in the commercial product shown by the popped-up image 600 is low. Thus, when the higher-precedence material is hidden by the popped-up image 600 and when the instruction mark 510 is located within the area where the popped-up image 600 is displayed, the controller 407 may display the alternative object 700 that is the alternative to the higher-precedence material.

Figure 10:
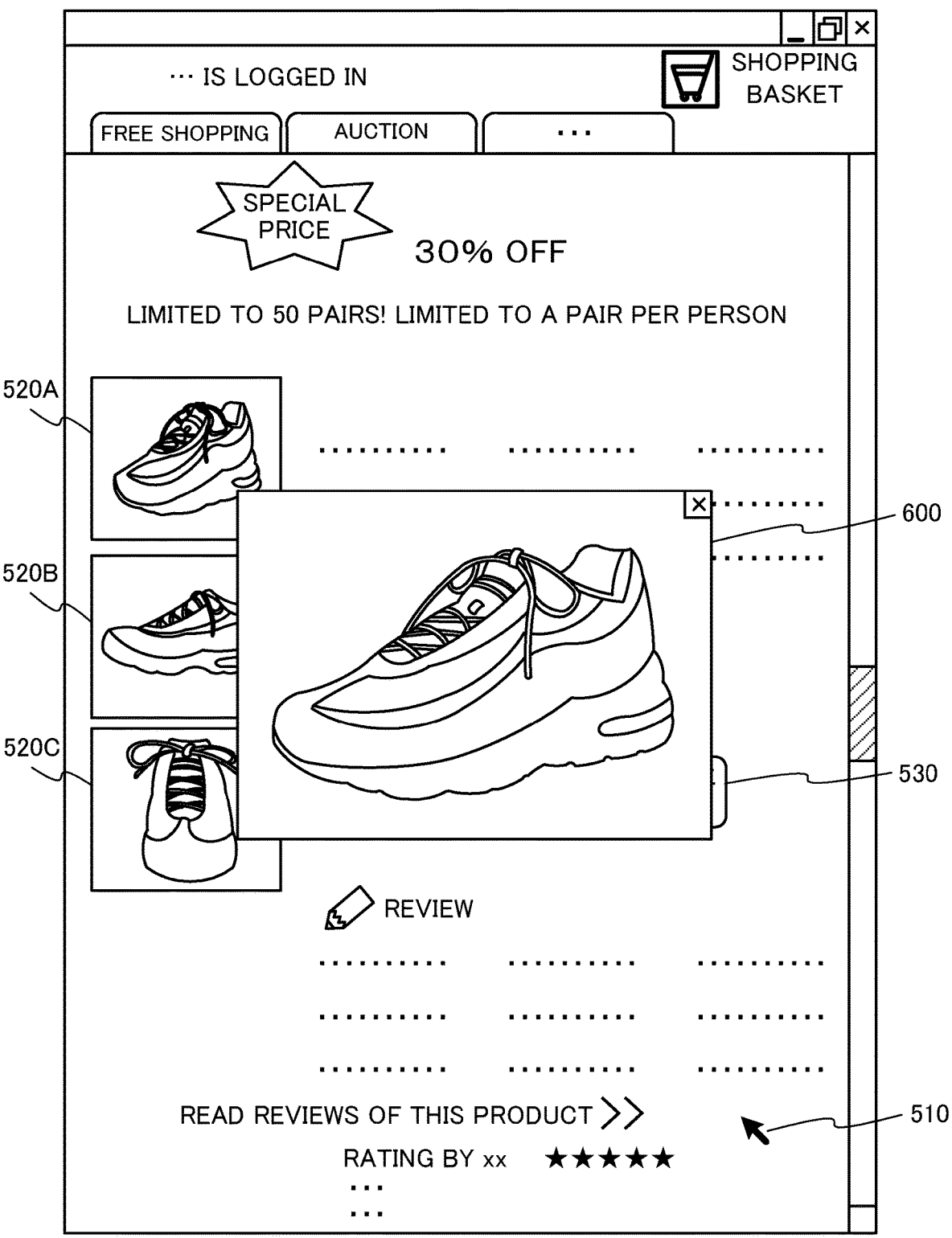
FIG. 10 is a diagram illustrating a display example of commercial product information and a popped-up image that does not contain an alternative material.
Figure 11:
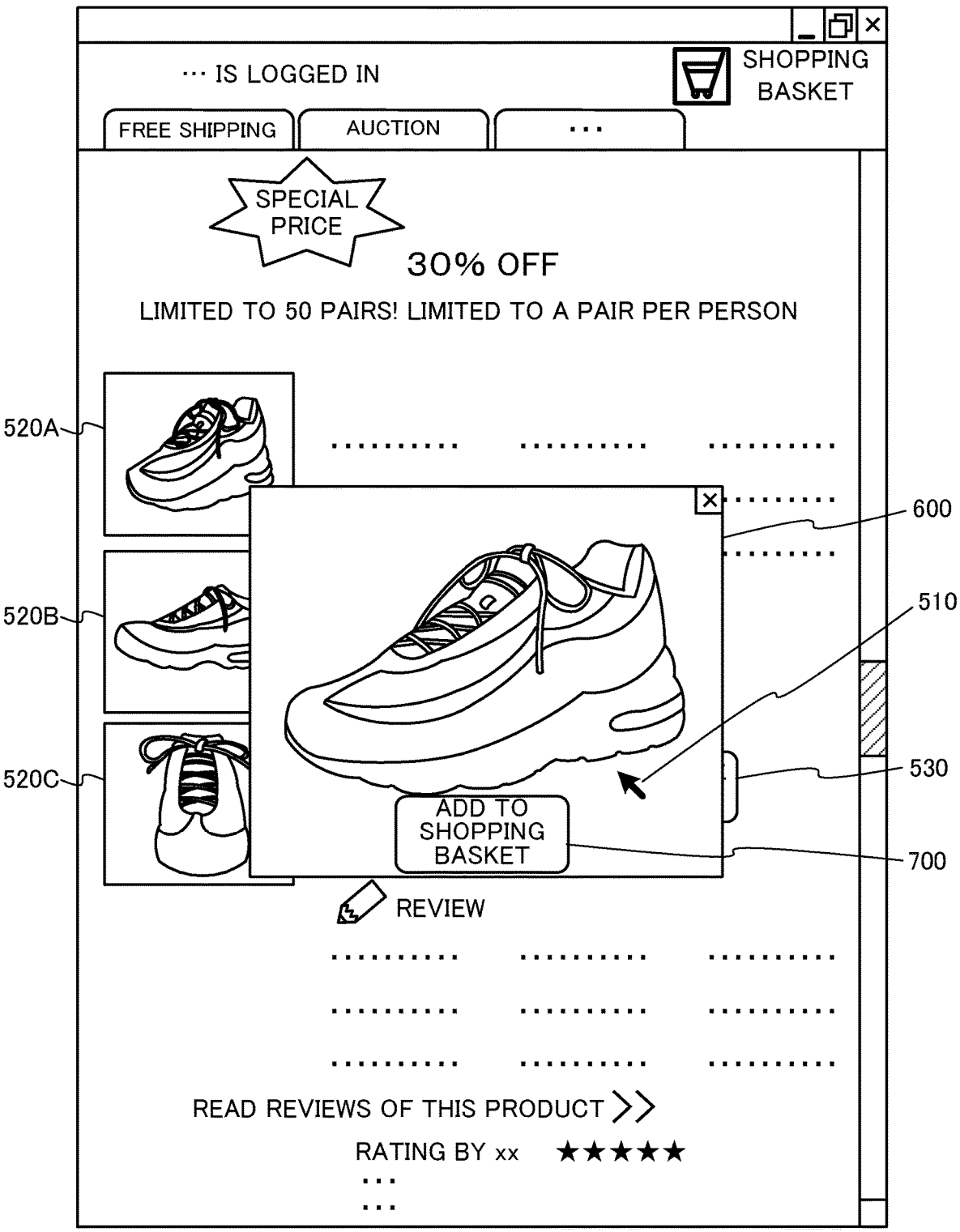
FIG. 11 is a diagram illustrating a display example of commercial product information and a popped-up image containing an alternative material.

For example, as illustrated in FIG. 10, when the instruction mark 510 is not located on the popped-up image 600, the controller 407 does not display, within the popped-up image 600, the alternative object 700 that is the alternative to the order-placing object 530 which is the higher-precedence material. Conversely, as illustrated in FIG. 11, when the instruction mark 510 is located on the popped-up image 600, the controller 407 displays, within the popped-up image 600, the alternative object 700 that is the alternative to the order-placing object 530 which is the higher-precedence material.

The controller 407 may change the size, shape, color, design, and the like of the popped-up image 600 based on whether or not the alternative object 700 is to be displayed.

Figure 12:
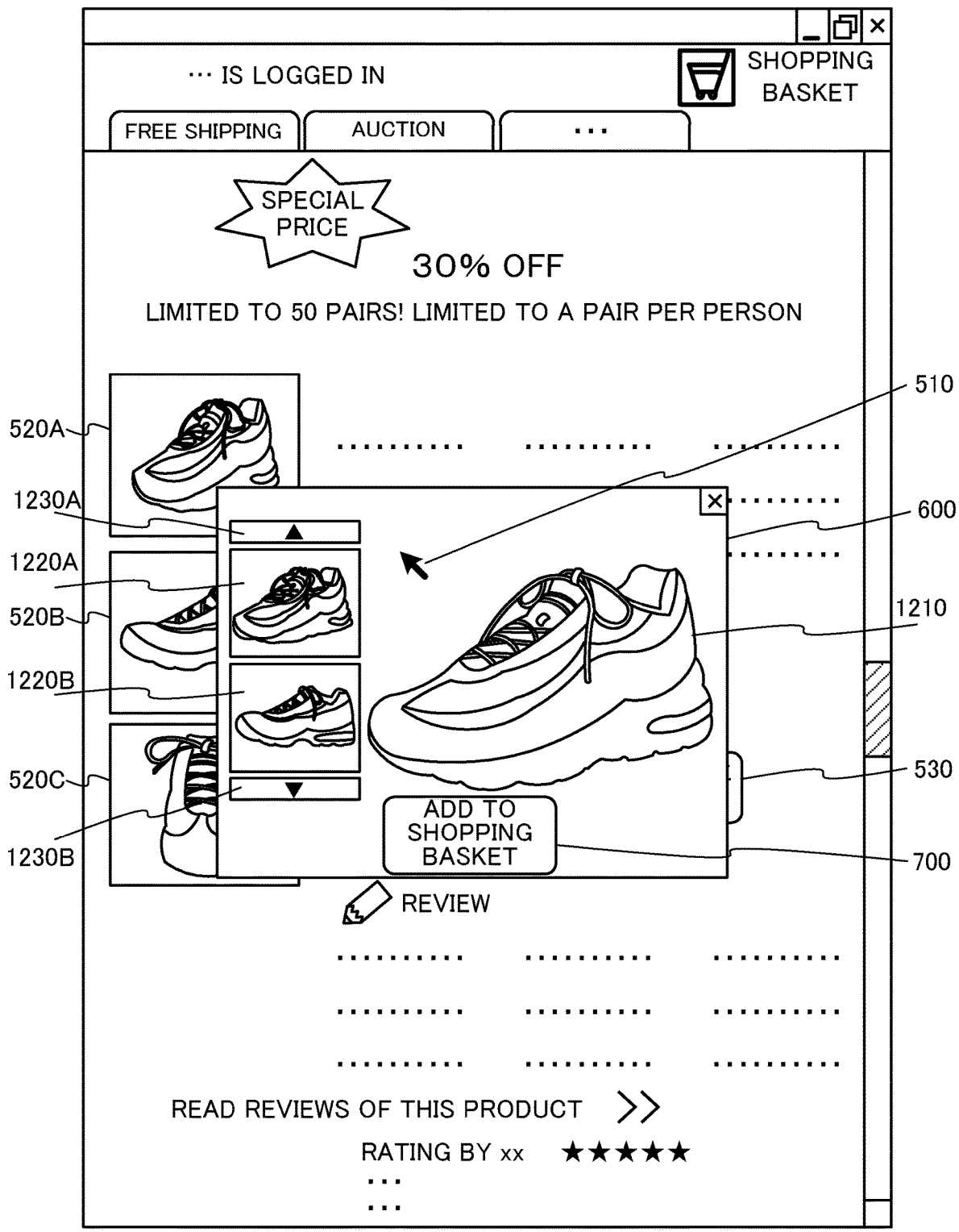
FIG. 12 is a diagram illustrating a display example of commercial product information and a popped-up image containing a thumbnail.

An image that is the same as or similar to the thumbnail 520 may be present within the popped-up image 600. For example, as illustrated in FIG. 12, the controller 407 displays a commercial product image 1210, a thumbnail 1220A that is the same as or similar to the thumbnail 520A, a thumbnail 1220B that is the same as or similar to the thumbnail 520B, and buttons 1230A and 1230B for changing the thumbnails displayed within the popped-up image 600. When all thumbnails cannot be displayed simultaneously within the popped-up image 600, the controller 407 may display the buttons 1230A and 1230B.

Figure 13:
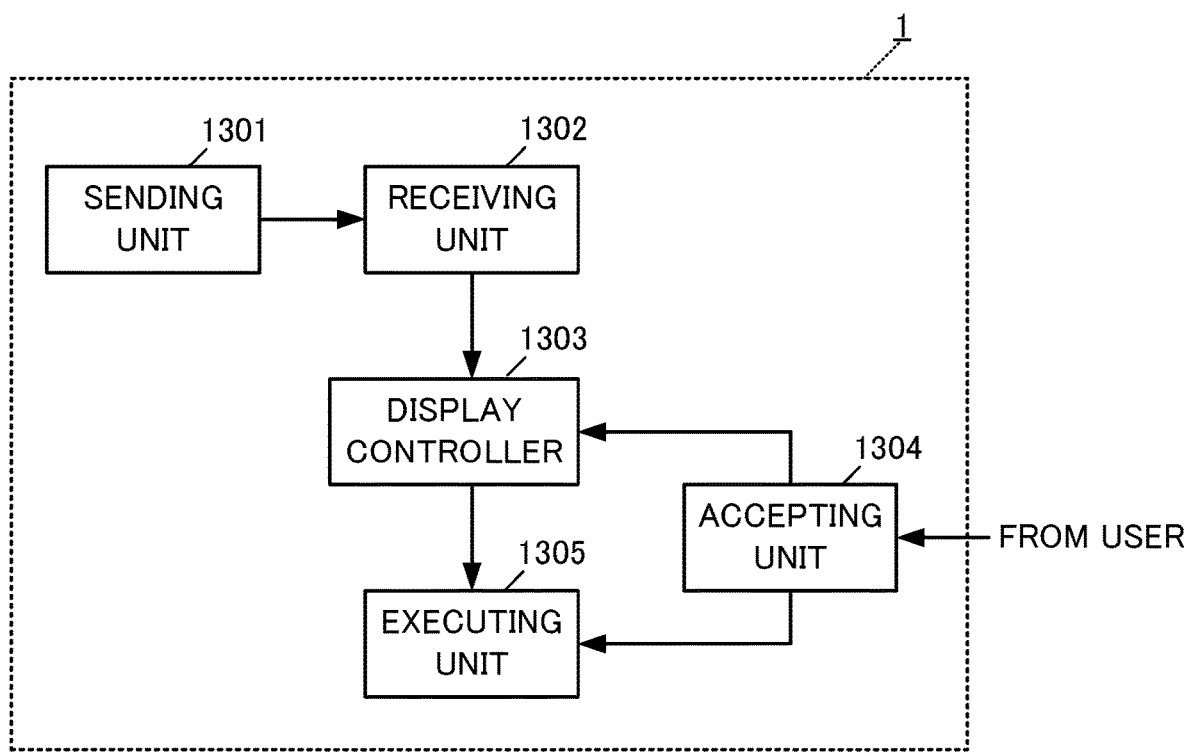
FIG. 13 is a diagram illustrating a functional structure of an electronic shopping mall system.

Next, a functional structure of the electronic shopping mall system 1 in this embodiment will be explained with reference to FIG. 13.

A sending unit 1301 sends, to the browsing device 30, the commercial product information based on a request from the browsing device 30. When, for example, an accepting unit 1304 accepts, from the user, an instruction to the effect that the commercial product information relating to the commercial product listed in the electronic shopping mall is to be displayed on the display 451, the controller 407 of the browsing device 30 requests the electronic shopping mall server 10 to send the commercial product information. The controller 203 of the electronic shopping mall server 10 obtains the commercial product information from the commercial product database 251, and sends the obtained commercial product information to the browsing device 30. The memory 201, communicating unit 202, and controller 203 of the electronic shopping mall server 10 that work in cooperation with one another function as the sending unit 1301.

The receiving unit 1302 receives the commercial product information from the electronic shopping mall server 10. The received commercial product information is stored in the memory 406. The communicating unit 401 and controller 407 of the browsing device 30 that work in cooperation with each other function as the receiving unit 1302.

Note that the data exchanged between the electronic shopping mall server 10 and the browsing device 30 contains not only the commercial product information, but also various contents, such as membership data, and advertisement data.

A display controller 1303 displays the commercial product information containing the higher-precedence material on the display 451. In addition, the display controller 1303 displays the popped-up image 600 in a manner superimposed on the commercial product information based on the instruction from the user accepted by the accepting unit 1304, and an event that occurs in response to the accepted instruction. Still further, if the higher-precedence material is hidden by the popped-up image 600, the display controller 1303 displays the alternative materials (the alternative objects) 700, 800, 910, and 920 within the popped-up image 600. The image processor 402 and the controller 407 that work in cooperation with each other function as the display controller 1303.

The accepting unit 1304 accepts, from the user, an operation to move the instruction mark 510, an operation to the commercial product information displayed on the display 451, an operation to the popped-up image 600, and the like. The input hardware 405 functions as the accepting unit 1304.

When the accepting unit 1304 accepts an operation to the higher-precedence material or the alternative material, an executing unit 1305 executes the process associated with the higher-precedence material or the alternative material. When, for example, the higher-precedence material is the order-placing object 530, and when the accepting unit 1304 accepts the user operation to the order-placing object 530, the executing unit executes the process associated in advance with the order-placing object 530, that is, the executing unit sends, to the electronic shopping mall server 10, a notification for placing an order to purchase the commercial product, and subsequently executes a payment process. The communicating unit 401 and the controller 407 that work in cooperation with each other function as the executing unit 1305.

Figure 14:
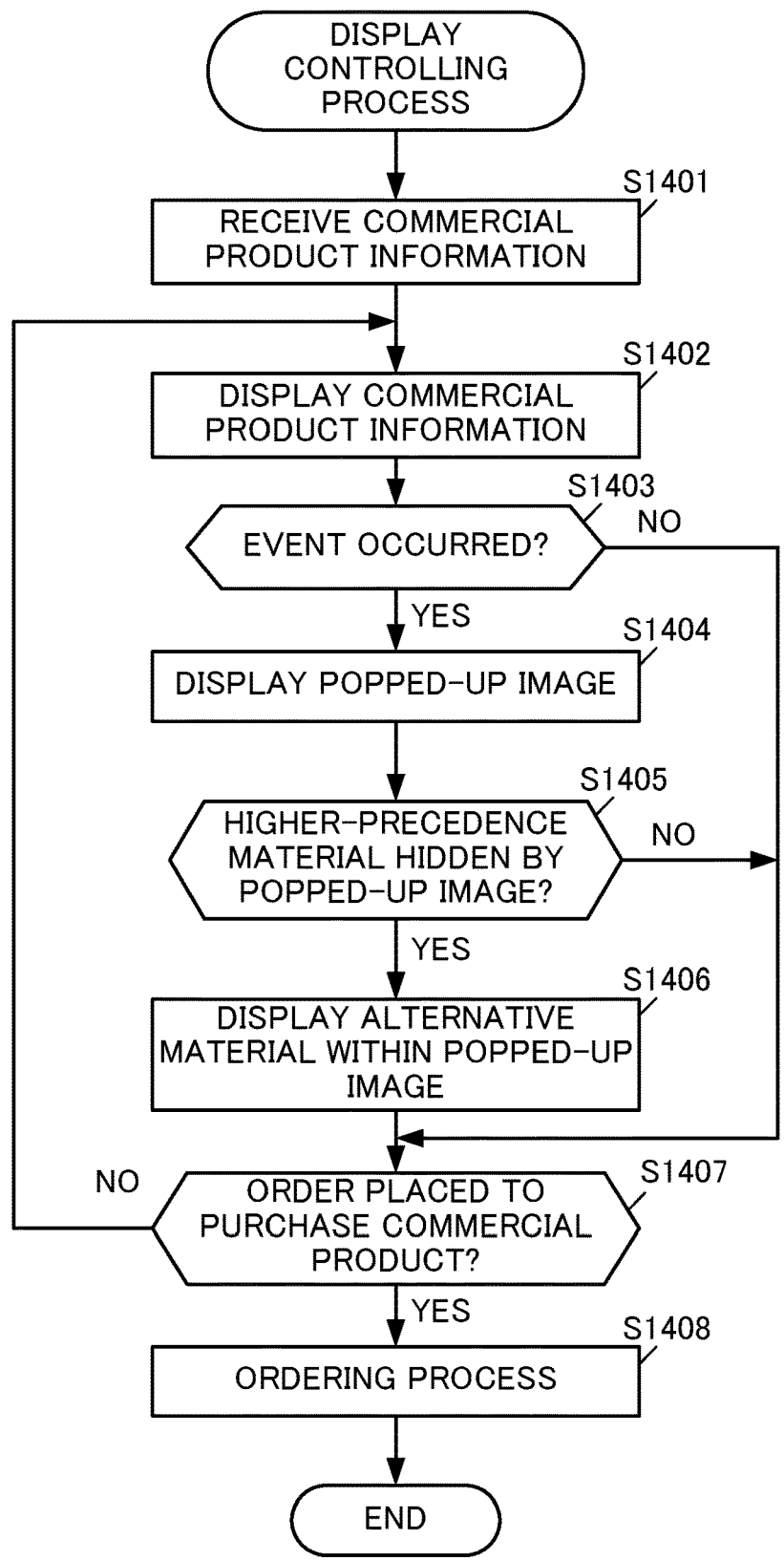
FIG. 14 is a flowchart for explaining a display controlling process.

Next, the flow of the display controlling process will be explained with reference to a flowchart of FIG. 14.

Initially, the controller 407 of the browsing device 30 activates a browser based on the user operation, and accesses an electronic shopping mall site. The controller 407 of the browsing device 30 sends, to the electronic shopping mall server 10, a request to the effect that the commercial product information be sent to the browsing device 30 based on the user operation. The controller 203 of the electronic shopping mall server 10 obtains the commercial product information from the commercial product database 251, and sends the obtained commercial product information to the browsing device 30. The controller 407 of the browsing device 30 receives the commercial product information from the electronic shopping mall server 10 (step S1401).

The controller 407 of the browsing device 30 displays (step S1402), for example, as illustrated in FIG. 5, the received commercial product information on the display 451.

The user can freely change the location of the instruction mark 510. The controller 407 determines whether or not an event has occurred which triggers the popped-up image 600 to be displayed (step S1403).

This event is, for example, an event that the instruction mark 510 is placed on the area where the thumbnail 520 is displayed.

Alternatively, the event may be an event that the instruction mark 510 is located on the area where the thumbnail 520 is displayed, and that the user gives an operation, such as clicking of a mouse.

Still further, the event may be an event that the instruction mark 510 is located on the area where the thumbnail 520 is continuously displayed over a predetermined time.

When determining that no event has occurred (step S1403; NO), the controller 407 transitions the process to a step S1407 to be discussed later. When determining that the event has occurred (step S1403; YES), the controller 407 displays (step S1404), for example, as illustrated in FIG. 6, the popped-up image 600.

The controller 407 determines whether or not the higher-precedence material is hidden by the popped-up image 600 (step S1405).

When determining that the higher-precedence material is hidden by the popped-up image 600 (step S1405; YES), the controller 407 displays, within the popped-up image 600, an alternative material that is the alternative to the higher-precedence material (step S1406).

For example, as illustrated in FIG. 7, when the order-placing object 530 that is the higher-precedence material is hidden by the popped-up image 600, the controller 407 displays, within the popped-up image 600, the alternative object 700 having the same functionality as that of the order-placing object 530, that is, the alternative object 700 that is a software button for accepting, from the user, an order to purchase the commercial product.

Conversely, when determining that the higher-precedence material is not hidden by the popped-up image 600 (step S1405; NO), the controller 407 transitions the process to the step S1407 to be discussed later. The alternative material is not displayed.

Next, the controller 407 determines whether or not there has been an order placed to purchase the commercial product shown by the commercial product information (step S1407). That is, the controller 407 determines whether or not the user has operated the order-placing object 530 or the alternative object 700.

When there has been no order placed to purchase the commercial product (step S1407; NO), the controller 407 repeats the processes from the step S1402 to the step S1407. When there has been an order to purchase the commercial product (step S1407; YES), the controller 407 executes an ordering process (step S1408).

In this ordering process, the browsing device 30 works in cooperation with the electronic shopping mall server 10, and accepts the order to purchase the commercial product, accepts an entry of a shipping address for the commercial product, notifies the shop, processes the payment, and the like.

Note that after finishing the ordering process, the controller 407 displays, on the display 451, information to the effect that the ordering process has been completed, and finishes the display controlling process. When accepting, from the user, a request to the effect that other commercial product information be browsed, the controller 407 starts again the display controlling process. When an instruction to close the browser is given by the user during the display controlling process, the controller 407 finishes the display controlling process, and closes the browser. If the user instruction is given while the popped-up image 600 is being displayed, the popped-up image 600 is deleted as the browser closes.

According to this embodiment, even if words, image, object, and the like suitable for always be presented to the user are hidden by the popped-up image 600, the same or similar words, image, object, and the like are displayed as respective alternatives, thereby improving user appeal of information.

Even if an important material that should be provided to the user is hidden by the popped-up image 600, the important material is further displayed within the popped-up image 600. Hence, the electronic shopping mall system 1 is capable of preventing the user from overlooking the important material.

By setting the higher-precedence material in advance in the commercial product information for the electronic shopping mall system 1, the alternative material that is the alternative to the higher-precedence material will be displayed within the popped-up image 600 even if this higher-precedence material is hidden by the popped-up image 600. Hence, as for the shop selling the commercial products, sales opportunities will not be missed as long as the button for accepting an order that is placed to purchase the commercial product is set in advance as the higher-precedence material since the button is always be presented to the user without being hidden. As for the user, whichever between the button that is set as the higher-precedence material, and the button displayed as the alternative material are operable, thus improving user convenience.

Still further, according to this embodiment, information to be presented to the user, such as an age requirement, a cancellation rule, a shipping cost, and a shipping date can always be displayed prior to accepting an order that is placed to purchase the commercial product, thereby preventing troubles beforehand which can occur upon sales.

The present disclosure is not limited to the aforementioned embodiments, and various modifications and applications can be made thereto. In addition, elements of the aforementioned embodiment can be freely combined.

In the aforementioned embodiment, the alternative material is displayed when the higher-precedence material is hidden by the popped-up image 600. However, the controller 407 may display the alternative material within a screen of the other application software when the higher-precedence material is hidden by not the popped-up image 600 but the screen of the other application software.

For example, it is assumed that two screens that are a window (a first content) which shows a screen for a first software, and a window (a second content) which shows a screen for a second software are displayed on the display 451. The first software is an Internet browser, while the second software is a help screen of this Internet browser. When the commercial product information contains therein the higher-precedence material describing words, "purchase of this product by a minor is prohibited", and when this higher-precedence material is hidden by the help screen, the controller 407 displays, within this help screen, an alternative material containing the same or similar content as that of the higher-precedence material.

A combination of the first software and the second software is optional and is not limited to the browser and the help screen thereof. Any combination is applicable among, for example, a text creator application, a spreadsheet, an editor for a text, a still image, a motion image or the like, a sound or motion image player, and a communication tool that involves entering of sounds or characters is applicable.

In addition, the first software and the second software may be the same. For example, the first content is a first tab in a tabbed browser, and the second content is a second tab in the same tabbed browser. When the higher-precedence material is displayed within the first tab, and the tab to be displayed is changed by the user, the higher-precedence material within the first tab is then hidden by the second tab. Thus, when the higher-precedence material displayed within the first tab is hidden due to the change of display from the first tab to the second tab, the controller 407 displays, within the second tab, the alternative material that is the alternative to the higher-precedence material.

The aforementioned embodiment has dealt with the commercial product information representing the commercial product to be sold in the electronic shopping mall. However, instead of the commercial product information, any optional content, such as a news article, a blog, a company profile, an advertisement, a game, an electronic bulletin board, or a text chat, is applicable.

A program for operating a computer as the browsing device 30 in whole or in part may be stored in a non-transitory computer readable recording medium, such as a memory card, a Compact Disc (CD), a Digital Versatile Disk (DVD), or a Magneto Optical Disk (MO), and be distributed. In addition, this stored and distributed program may be installed in a separate computer to cause this computer to operate as the aforementioned means, or to execute the aforementioned processes.

Furthermore, the program may be stored in advance in a disk device or the like included in a server device on the Internet. The program may be, for example, downloaded to a computer in a manner superimposed on carrier waves.

According to the present disclosure, it is capable to provide the browsing device, the display controlling method, the non-transitory recording medium, the program which are suitable for preventing the user from overlooking an important material.

REFERENCE SIGNS LIST

1 Electronic shopping mall system
10 Electronic shopping mall server
20, 20A, 20B, 20C Shop terminal
30, 30A, 30B, 30C Browsing device
50 Communication network
201 Memory
202 Communicating unit
203 Controller
251 Commercial product database
401 Communicating unit
402 Image processor
403 Sound processor
404 I/O hardware
405 Input hardware
406 Memory
407 Controller
510 Instruction mark
520, 520A, 520B, 520C Thumbnail 530 Order-placing object (higher-precedence material)
600 Popped-up image
700, 800, 910, 920 Alternative object (alternative material)
1301 Sending unit
1302 Receiving unit
1303 Display controller
1304 Accepting unit
1305 Executing unit

The invention claimed is:

1. A browsing device comprising:
at least one memory configured to store computer program code; and
at least one processor configured to access said computer program code and operate as instructed by the computer program code, the computer program code including:
web-page display code configured to cause at least one of said at least one processor to cause a display to display a web-page containing one or more product images and a higher-precedence material; and
pop-up image-area control code configured to cause at least one of said at least one processor to:
in response to an occurrence of an event for a product image of the one or more product images displayed on the web-page, cause the display to display a pop-up image-area containing a larger version of the product image in a manner superimposed on the web-page, wherein the product image has a first size, and the larger version of the product image has a second size, which is larger than the first size, and
when the pop-up image-area moves from not being over the higher-precedence material to being over the higher-precedence material such that the higher-precedence material is hidden by the pop-up image-area, identify a location for an alternative version of the higher-precedence material within the pop-up image-area such that the alternative version of the higher-precedence material does not overlap with the larger version of the product image in the pop-up image-area, and display the alternative version of the higher-precedence material at the identified location within the pop-up image-area, wherein the alternative version of the higher-precedence material is displayed completely within the pop-up image-area.

2. The browsing device according to claim 1, wherein the pop-up image-area control code is further configured to cause at least one of said at least one processor to:
accept an operation to the web-page or to the displayed pop-up image-area; and
execute a process associated with the higher-precedence material when the accepted operation to the web-page or to the displayed pop-up image-area is an operation on the alternative version of the higher-precedence material.

3. The browsing device according to claim 2, wherein the process associated with the higher-precedence material is a process of starting a placement of an order to purchase an object corresponding to the product image.

4. The browsing device according to claim 1, wherein an appearance of the alternative version of the higher-precedence material that is displayed on the display is associated in advance with an appearance of the higher-precedence material displayed on the display.

5. The browsing device according to claim 1, wherein the pop-up image-area control code is further configured to cause at least one of said at least one processor to moves the pop-up image area based on receiving a user instruction associated with a location within a screen of the display.

6. The browsing device according to claim 1, wherein:
the higher-precedence material includes a plurality of pieces of higher-precedence materials; and
the pop-up image-area control code is further configured to cause at least one of said at least one processor to cause the display to dispose, within the pop-up image-area, a plurality of alternative versions that respectively correspond to the plurality of pieces of higher-precedence materials when all of the plurality of pieces of higher-precedence materials of the web-page are hidden by the pop-up image-area.

7. The browsing device according to claim 1, wherein:
the pop-up image-area control code is further configured to cause at least one of said at least one processor to, identify whether a pointer or a cursor clicks on the product image, and cause the display to display the pop-up image-area including the alternative version of the higher-precedence material in the pop-up image-area based on identifying that the pointer or the cursor clicks on the product image.

8. The browsing device according to claim 1, wherein the pop-up image-area control code is further configured to cause at least one of said at least one processor to:
determine, based on a pixel value associated with each pixel constructing the pop-up image-area, an area formed by a predetermined number or more of adjacent pixels that are each associated with a pixel value representing a background color or background colors of the pop-up image-area, and
cause the display to dispose the alternative version of the higher-precedence material within the determined area.

9. The browsing device according to claim 8, wherein the pop-up image-area control code is further configured to cause at least one of said at least one processor to cause the display to expand the pop-up image-area, and dispose the alternative version of the higher-precedence material within the expanded pop-up image area when there is no area formed by the predetermined number or more of adjacent pixels that are each associated with the pixel value representing the background color or background colors of the pop-up image-area.

10. The browsing device according to claim 1, wherein the pop-up image-area control code is further configured to cause at least one of said at least one processor to add the alternative version of the higher-precedence material within the pop-up image-area when the higher-precedence material of the web-page is hidden due to a scrolling of the displayed web-page after the display displays the pop-up image-area without the alternative version of the higher-precedence material.

11. The browsing device according to claim 1, wherein the pop-up image-area control code is further configured to cause at least one of said at least one processor to cause the display to delete the alternative version of the higher-precedence material from the pop-up image-area when the higher-precedence material of the web-page is no longer hidden due to a scrolling of the displayed web-page after the display displays the pop-up image-area containing the alternative version of the higher-precedence material.

12. The browsing device according to claim 1, wherein the displayed one or more product images include one or more thumbnail images, the displayed one or more thumbnail images include the product image having the first size; and the pop-up image-area control code is further configured to cause at least one of said at least one processor to, in response to a user selecting or clicking on the thumbnail product image: cause the display to display the pop-up image-area including the larger version of the thumbnail product image in a manner such that the larger image is superimposed on the web-page, and when the higher-precedence material of the web-page is hidden by the pop-up image-area, the alternative version of the thumbnail product image and the alternative version of the higher-precedence material are displayed completely within the pop-up image-area.

13. The browsing device according to claim 1, wherein the pop-up image-area control code is further configured to cause at least one of said at least one processor to, identify whether a pointer or a cursor moves over the product image, and cause the display to display the pop-up image-area including the alternative version of the higher-precedence material in the pop-up image-area based on identifying that the pointer or the cursor moves over the product image.

14. The browsing device according to claim 1, wherein
the identifying of the location for the version of the higher-precedence material includes: obtaining a pixel value of each pixel that constructs image data corresponding to the alternative version of the product image displayed within the pop-up image-area, the pixel value being expressed by a combination of an illuminance value of red (R), an illuminance value of green (G), and an illuminance value of blue (B), and determining a blank area where equal to or greater than a reference number of pixels representing background or a white color are disposed adjacent to one another, and
the pop-up image-area control code is further configured to cause at least one of said at least one processor to display the alternative version of the higher-precedence material within the determined blank area, when the pop-up image-area moves over the higher-precedence material of the web-page such that the higher-precedence material of the web-page is hidden by the pop-up image-area.

15. The browsing device according to claim 1, wherein the alternative version of the higher-precedence material includes an order-placing button used for placing an order for a product displayed as the product image.

16. A display controlling method comprising:
causing a display to display a web-page containing one or more product images and a higher-precedence material;
in response to an occurrence of an event for a product image of the one or more product images displayed on the web-page, causing the display to display a pop-up image-area containing a larger version of the product image in a manner superimposed on the web-page, wherein the product image has a first size, and the larger version of the product image has a second size, which is larger than the first size; and
when the pop-up image-area moves from not being over the higher-precedence material to being over the higher-precedence material such that the higher-precedence material is hidden by the pop-up image-area, identifying a location for an alternative version of the higher-precedence material within the pop-up image-area such that the alternative version of the higher-precedence material does not overlap with the alternative version of the product image in the pop-up window, and causing the display to display the alternative version of the higher-precedence material at the identified location within the pop-up image-area, wherein the alternative version of the higher-precedence material is displayed completely within the pop-up image-area.

17. A non-transitory computer readable recording medium having stored therein computer-executable code that, when executed by a computer, causes the computer to:
cause a display to display a web-page containing one or more product images and a higher-precedence material;
in response to an occurrence of an event for a product image of the one or more product images displayed on the web-page, cause the display to display a pop-up image-area containing a larger version of the product image in a manner superimposed on the web-page, wherein the product image has a first size, and the larger version of the product image has a second size, which is larger than the first size; and
when the pop-up image-area moves from not being over the higher-precedence material to being over the higher-precedence material such that the higher-precedence material is hidden by the pop-up image-area, identify a location for an alternative version of the higher-precedence material within the pop-up image-area such that the alternative version of the higher-precedence material does not overlap with the larger version of the product image in the pop-up image-area, and display the alternative version of the higher-precedence material at the identified location within the pop-up image-area, wherein the alternative version of the higher-precedence material is displayed completely within the pop-up image-area.

* * * * *